United States Patent
Prinsen

(10) Patent No.: US 8,100,797 B2
(45) Date of Patent: Jan. 24, 2012

(54) METHOD FOR FORMING A TILTING ZONE ON A TRANSVERSE ELEMENT FOR A PUSH BELT FOR A CONTINUOUSLY VARIABLE TRANSMISSION

(75) Inventor: Lucas Hendricus Maria Prinsen, Loon Op Zand (NL)

(73) Assignee: Robert Bosch GmbH (DE)

( * ) Notice: Subject to any disclaimer, the term of this patent is extended or adjusted under 35 U.S.C. 154(b) by 495 days.

(21) Appl. No.: 12/303,580

(22) PCT Filed: Jun. 6, 2007

(86) PCT No.: PCT/NL2007/000142
§ 371 (c)(1),
(2), (4) Date: Dec. 5, 2008

(87) PCT Pub. No.: WO2007/142517
PCT Pub. Date: Dec. 13, 2007

(65) Prior Publication Data
US 2010/0227719 A1    Sep. 9, 2010

(30) Foreign Application Priority Data
Jun. 7, 2006 (NL) .................................. 1031963

(51) Int. Cl.
*F16G 5/16* (2006.01)

(52) U.S. Cl. .................. 474/242; 474/201; 474/272
(58) Field of Classification Search .............. 474/201, 474/237, 240–245, 272
See application file for complete search history.

(56) References Cited

U.S. PATENT DOCUMENTS

| | | | | |
|---|---|---|---|---|
| 5,019,020 A | * | 5/1991 | van Lith | 474/240 |
| 6,705,963 B2 | * | 3/2004 | Smeets et al. | 474/242 |
| 6,875,143 B2 | * | 4/2005 | Brandsma | 474/242 |

* cited by examiner

*Primary Examiner* — William E Dondero
(74) *Attorney, Agent, or Firm* — Ryan A. Schneider, Esq.; Troutman Sanders LLP

(57) ABSTRACT

A method for forming a convex tilting zone (23) at a main body-surface (11) of a transverse element for application in a push belt for a continuously variable transmission comprises the step of applying a die (30) that is placed against the main body surface (11) under pressure. However, the die (30) is pressed against the main body surface (11) just outside of an area where the tilting zone (23) needs to be formed. By applying the die (30), a recessed area (27) is arranged in the main body surface (11), wherein retraction of the material of the transverse element takes place along an upper edge (28) of this area (27). A retraction area that is obtained in this manner is suitable to function as tilting zone (23). An important advantage of the application of the described method is that the pressure that is exerted on the die (30) may be considerably lower than the pressure that is required during conventional processes for forming a tilting zone (23).

8 Claims, 3 Drawing Sheets

METHOD FOR FORMING A TILTING ZONE ON A TRANSVERSE ELEMENT FOR A PUSH BELT FOR A CONTINUOUSLY VARIABLE TRANSMISSION

This application is a US National Stage of International Application No. PCT/NL2007/000142, filed 6 Jun. 2007, which claims the benefit of NL 1031963, filed 7 Jun. 2006.

FIELD OF THE INVENTION

The invention relates to a method for forming a convex tilting zone in a defined area of a main body surface of a transverse element that is destined to be part of a push belt for a continuously variable transmission having two pulleys for suspending the push belt, wherein a tool element is pressed against the main body surface of the transverse element in order to realize a displacement of material over the main body surface.

BACKGROUND OF THE INVENTION

A push belt for a continuously variable transmission is generally known. Usually, such a push belt comprises two endless, ribbon-like carriers shaped like a closed loop for carrying a relatively large number of transverse elements. The transverse elements are arranged along the entire circumference of the carriers, wherein, during operation, they are able to transmit forces which are related to a movement of the push belt. Both the carriers and the transverse elements are manufactured from metal.

In the following description of the transverse element, the directions as mentioned refer to the situation in which the transverse element is part of the push belt. A longitudinal direction of the transverse element corresponds to a circumferential direction of the push belt. A vertical transverse direction of the transverse element corresponds to a radial direction of the push belt. A horizontal transverse direction of the transverse element corresponds to a direction perpendicular to both the longitudinal direction and the vertical transverse direction.

The transverse element has a first main body surface and a second main body surface, which are extending substantially parallel with respect to each other, substantially perpendicular to the longitudinal direction. The two main body surfaces have substantially the same contour, but a relief that is provided in each of the main body surfaces is different. At least a portion of the first main body surface of the transverse element is destined to contact at least a portion of the second main body surface of an adjacent transverse element in the push belt, whereas at least a portion of the second main body surface of the transverse element is destined to contact at least a portion of the first main body surface of another adjacent transverse element in the push belt. A circumferential surface, which has a relatively small dimension in the longitudinal direction, is extending between the two main body surfaces.

Two portions of the circumferential surface of the transverse element are destined to function as support surfaces for supporting the carriers of a push belt. These support surfaces are extending at an equal level. Two other portions of the circumferential surface of the transverse element are destined to function as contact surfaces for realizing contact between the transverse element and pulley sheaves of a pulley of a continuously variable transmission. These contact surfaces are extending at an angle with respect to each other, wherein these contact surfaces are divergent in a direction towards the support surfaces. The terms "top" and "bottom" which are used in the following are related to the direction of divergence; this is defined as being from bottom to top.

In the vertical transverse direction, from bottom to top, the transverse element comprises successively a basic portion, a neck portion and a top portion, wherein, in the horizontal transverse direction, the dimensions of the neck portion are relatively small. The basic portion comprises the support surfaces and the contact surfaces. In the push belt, the basic portion is located at the side of the inner circumference of the push belt, whereas the top portion is located at the side of the outer circumference of the push belt.

In one of the main body surfaces of the transverse element, a convex zone is located, which will hereinafter be referred to as tilting zone. This zone is extending along an entire width of the transverse element, and forms an even and round transition between two planar areas of the main body surface, which are located above each other in the vertical transverse direction. Usually, the tilting zone is located in a top part of the basic portion. An important function of the tilting zone is guaranteeing mutual contact between adjacent transverse elements which are located between the pulley sheaves of a pulley during operation of the push belt, and which are performing a tilting movement with respect to each other. By maintaining contact along a defined line, it is achieved that the forces which are related to a movement of the push belt are transmitted between adjacent transverse elements in a controlled fashion, under all circumstances.

According to the state of the art, the tilting zone is formed in the main body surface of the transverse element by clamping the transverse element or a piece of basic material from which the transverse element is manufactured between two tool elements, wherein a surface of one of the tool parts has a concave portion, as a negative of the convex tilting zone to be formed. When the tool elements having the transverse element positioned between them are moved towards each other under the influence of pressure, a displacement of material over a main body surface of the transverse elements, which is located at the side of the tool element having the concave portion, is being forced. It is especially achieved that material flows into a space that, in a first instance, is offered by the concave portion of the surface of the tool element. In this way, the convex zone is obtained on the main body surface of the transverse element.

The conventional method for forming the tilting zone in the main body surface of the transverse element has a number of disadvantages. In the first place, it is a costly matter to manufacture a tool element having a surface with an accurately defined concave portion. In the second place, the pressing forces which are needed to move the tool elements having the transverse element positioned between them towards each other are relatively high, as a consequence of which a relatively heavy construction is needed. In practice, there is a considerable risk that a required level of the pressing forces is not reached, and that the shape of the concave portion of the surface of the transverse element is not exactly taken up in the main body surface of the transverse element, as a consequence of which the shape of the eventually obtained tilting zone deviates from a defined shape.

BRIEF SUMMARY OF THE INVENTION

In view of the disadvantages as mentioned, it is an objective of the invention to come to another method for forming a tilting zone in a main body surface of a transverse element, wherein only relatively low pressures are needed, wherein considerably less expensive tool elements may be applied, and wherein it is well possible to realize a defined shape of the tilting zone in practice.

The objective as formulated in the previous paragraph is achieved by a method for forming a convex tilting zone in a defined area of a main body surface of a transverse element, wherein a tool element is pressed against the main body surface adjacent to the defined area of the main body surface in which the convex tilting zone needs to be formed in order to realize a displacement of material over the main body surface, and wherein the convex tilting zone is at least also formed under the influence of retraction of material as a consequence of pressing the tool element against the main body surface.

According to the invention, an area on a main body surface of a transverse element in which a tilting zone needs to be formed is formed by pressing a tool element against the main body surface. As far as this general aspect is concerned, the method according to the invention is equal to the method according to the state of the art. However, a special feature of the method according to the invention is the fact that the tool element acts on the main body surface outside of the area in which the tilting zone needs to be formed. Hence, in principle, the known option of applying a tool element with a surface having a negative of the tilting zone is not being used. Instead, or at least in addition, according to an important insight underlying the invention, a phenomenon that is known as retraction of the metal of the transverse element is being used. By doing so, the tilting zone is at least also obtained in an indirect manner, on the basis of material behavior occurring at the position of an edge of an area against which the tool element is being pressed.

By pressing a tool element against the main body surface of the transverse element, and realizing a recess in the main body surface with respect to a surrounding area of the main body surface, retraction takes place in an area along an edge of this recess. As a consequence, a gradual transition between the recess and the surrounding area is obtained, wherein this transition is provided with a convex curvature. On the basis of this fact, the transition that is extending along an edge of the area of the main body surface against which the tool element is pressed is suitable to function as tilting zone. It appears from tests which have been performed in the context of the invention that the shape and dimensions of a tilting zone thus obtained are sufficient in practice, indeed.

In order to obtain a result which is as accurate as possible when the method according to the invention is applied, the tool element is pressed against the main body surface of the transverse element adjacent to the defined area of the main body surface in which the convex tilting zone needs to be formed. In this way, it is realized that the retraction takes place in the area that is destined for this purpose, as a result of which it is possible to accurately position the tilting zone formed on the basis of the retraction.

It is very advantageous to apply a tool element having a substantially planar portion, wherein the substantially planar portion of the tool element is pressed against the main body surface of the transverse element. Application of such a tool element leads to retraction along an entire edge of the element. Moreover, as a consequence of the simple shape of its functional portion, such a tool element is relatively cheap.

The main body surface of the transverse element may have a stepped shape, wherein at least two areas of the main body surface are extending at different levels, and are connected to each other through a step. Usually, an area of the main body surface on a bottom part of the basic portion of the transverse element is recessed with respect to a portion of the main body surface which is at a higher location. As a result, unwanted contact between the bottom parts of the basic portions of adjacent transverse elements which are positioned in a push belt, and which are moving in the push belt over a pulley of a continuously variable transmission, is avoided. In such a case, the tilting zone needs to be formed at the place of a top part of the basic portion of the transverse element. In the process, it is sufficient to press the tool element on the basic portion exclusively against an elevated area of the main body surface of the transverse element.

Preferably, in case of the main body surface of the transverse element having a stepped shape, a tool element that is capable of extending at least over an area of the main body surface of the transverse element, which is located between the defined area of the main body surface in which the convex tilting zone needs to be formed and an area where the two areas of the main body surface of the transverse element, which are extending at different levels are connected to each other, is applied. In this way, it is achieved that an area of the main body surface which is extending between the tilting zone to be formed and the step is being recessed in its entirety, and the occurrence of a local recess in the main body surface, which does not extend all the way to the step, is avoided. In that case, no other transition areas than the tilting zone are formed in the main body surface of the transverse element.

It follows from the foregoing that application of the method according to the invention provides a number of important advantages. It is possible to apply a tool element having a functional portion with a relatively simple shape, wherein an even displacement of material over the main body surface of the transverse element is obtained, and pressures which are not too high may be applied. Among other things, as a consequence of these facts, the formation of a tilting zone in a main body surface of a transverse element is a process that is well reproducible, with which a defined position and shape of the tilting zone may be realized.

For sake of completeness, it is noted that the method according to the invention is applicable in various processes for manufacturing transverse elements. An example of such a process is a process that is known as fine blanking, wherein the transverse elements are blanked out of a sheet or strip of basic material, wherein not only a cutting member, but also a supporting member is applied, and wherein a transverse element to be formed is located between these two members. Another example of such a process is a process wherein the transverse elements are formed by successively carrying out various cutting actions and treatments of the surface of a transverse element to be formed. In this process, forming the tilting zone by pressing a tool element against a main body surface of a transverse element to be formed may simply be one of the treatment steps.

BRIEF DESCRIPTION OF THE DRAWINGS

The invention will be further explained on the basis of the following description of the invention with reference to the drawing, in which equal reference signs indicate equal or similar components, and in which.

DETAILED DESCRIPTION OF PREFERRED EMBODIMENTS

Figure 1:
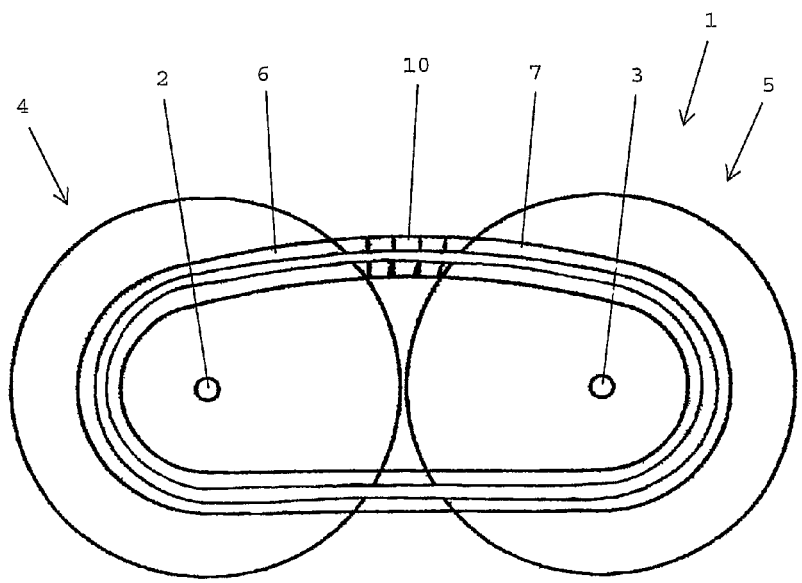
FIG. 1 diagrammatically shows a side view of a continuously variable transmission having a push belt.

FIG. 1 diagrammatically shows a continuously variable transmission, which is especially suitable for utilization in a motor vehicle. The continuously variable transmission is indicated in general by the reference sign 1.

The continuously variable transmission 1 comprises two pulleys 4, 5 which are arranged on separate pulley shafts 2, 3. An endless push belt 6 being shaped like a closed loop is arranged around the pulleys 4, 5, and serves for transmitting torque between the pulley shafts 2, 3. Each of the pulleys 4, 5 comprises two pulley sheaves, wherein the push belt 6 is positioned and clamped between said two pulley sheaves, so that a force may be transmitted between the pulleys 4, 5 and the push belt 6 with the help of friction.

The push belt 6 comprises at least one endless carrier 7, which is usually composed of a number of rings. Along the entire length of the carrier 7, transverse elements 10 are arranged, wherein the transverse elements 10 are mutually adjacent to each other and are moveable with respect to the carrier 7 in the circumferential direction. For sake of simplicity, only a number of these transverse elements 10 is shown in FIG. 1. Both the carrier 7 and the transverse elements 10 are manufactured from metal.

Figures 2, 3:
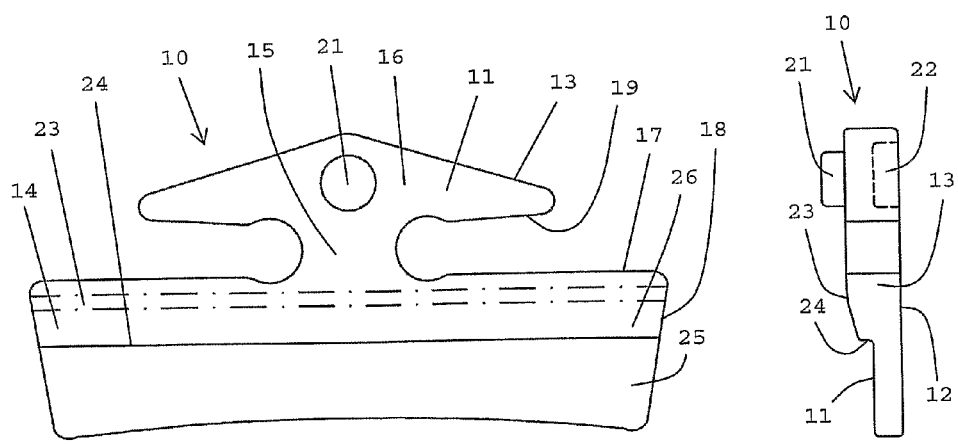
FIG. 2 shows a front view of a transverse element for a push belt for a continuously variable transmission.
FIG. 3 shows a side view of the transverse element shown in FIG. 2.

FIGS. 2 and 3 show a transverse element 10. A first main body surface of the transverse element 10 is indicated in general by the reference sign 11, whereas a second main body surface of the transverse element 10 is indicated in general by the reference sign 12. A circumferential surface 13 is extending between the main body surfaces 11, 12.

In the vertical transverse direction, the transverse element 10 comprises successively a basic portion 14, a relatively narrow neck portion 15 and a top portion 16 being shaped like the tip of an arrow. In the push belt 6, the basic portion 14 is located at the side of the inner circumference of the push belt 6, whereas the top portion 16 is located at the side of the outer circumference of the push belt 6. Furthermore, in a push belt 6, at least a portion of the first main body surface 11 of the transverse element 10 contacts at least a portion of the second main body surface 12 of an adjacent transverse element 10, whereas at least a portion of the second main body surface 12 of the transverse element 10 contacts at least a portion of the first main body surface 11 of another adjacent transverse element 10. At the transition to the neck portion 15, the basic portion 14 of the transverse element 10 as shown in FIG. 2 comprises two carrying surfaces 17 which serve for supporting two carriers 7. Furthermore, the basic portion 14 comprises two pulley sheave contact surfaces 18. When the transverse element 10 moves over a pulley 4, 5, contact between the transverse element 10 and contact surfaces of the pulley sheaves is realized through said pulley sheave contact surfaces 18. Both the carrying surfaces 17 and the pulley shave contact surfaces 18 are part of the circumferential surface 13.

A projection 21 is arranged at the first main body surface 11 of the transverse element 10. In the shown example, the projection 21 is located at the top portion 16, and corresponds to a recess 22 in the second main body surface 12. In the push belt 6, the projection 21 of the transverse element 10 is at least partly located in the recess 22 of an adjacent transverse element 10. The projection 21 and the corresponding recess 22 serve to prevent mutual displacement of adjacent transverse elements 10 in a plane perpendicular to the circumferential direction of the push belt 6.

The top portion 16 comprises two retaining surfaces 19 which are located opposite to the carrying surfaces 17, and which are part of the circumferential surface 13. When the transverse element 10 is received in a push belt 6, a space in which the carriers 7 are located is delimited by the carrying surfaces 17 on the one hand and by the retaining surfaces 19 on the other hand in the radial direction.

Besides a projection 21, a tilting zone 23 and a step 24 are also arranged at the first main body surface 11 of the transverse element 10. The step 24 is located between a bottom part 25 and a top part 26 of the basic portion 14, wherein the first main body surface 11 has a recessed location at the place of the bottom part 25 of the basic portion 14. The tilting zone 23 is located in the top part 26 of the basic portion 14, at a small distance with respect to the carrying surfaces 17, and is extending along an entire width of the transverse element 10. The tilting zone 23 is shaped as a convexly curved transition area at the main body surface 11 of the transverse element 10, and serves to guarantee a defined mutual contact between adjacent transverse elements 10 in the push belt 6 under all circumstances, also when the transverse elements 10 are moving over a pulley 4, 5 of the continuously variable transmission 1 and need to follow a circular path. In FIG. 2, an upper edge and a lower edge of the tilting zone 23 are diagrammatically indicated by means of dot and dash lines.

Figure 4:
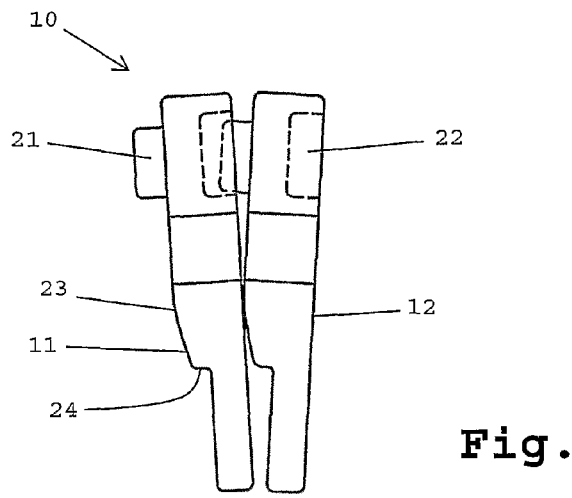
FIG. 4 shows a side view of two adjacent transverse elements as located between pulley sheaves of a pulley of the continuously variable transmission shown in FIG. 1.

FIG. 4 serves to illustrate a mutual positioning of two adjacent transverse elements 10 which are located between pulley sheaves of a pulley 4, 5. For sake of clarity, in this figure, the recess 22 of the transverse element 10 is diagrammatically indicated by means of dashed lines. In the figure, it may be clearly seen that the transverse elements 10 only contact each other at the place of the tilting zone 23.

In the following, a method for forming the tilting zone 23 in the main body surface 11 of the transverse element 10 will be described on the basis of FIGS. 5a and 5b.

Figures 5A, 5B:
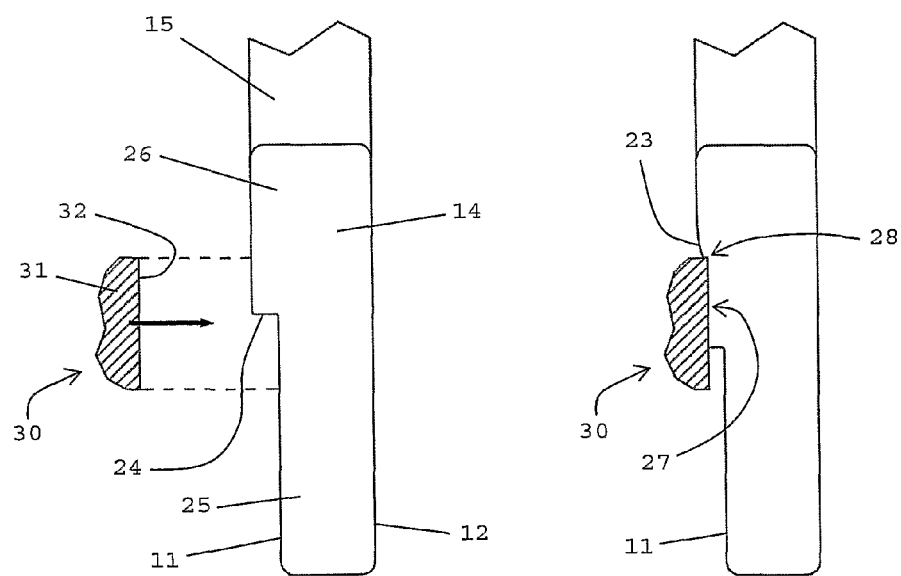
FIGS. 5a and 5b illustrate a method for forming a tilting zone in a main body surface of a transverse element.

In FIG. 5a shows diagrammatically a side view of the basic portion 14 and an adjacent part of the neck portion 15. In this figure, a level difference in the first main body surface 11 at the place of the bottom part 25 and the top part 26 of the basic portion 14 may be clearly seen, as well as the step 24 which is located between these two parts 25, 26. Prior to the formation of the tilting zone 23, the first main body surface 11 may be entirely planar at the place of both parts 25, 26 of the basic portion 14, as is the case in the shown example.

For the purpose of forming the tilting zone 23, a die 30 is applied, which has a die part 31 having a substantially planar contact surface 32. The die part 31 of the die 30 is pressed against the first main body surface 11 of the transverse element 10. In FIG. 5a, a movement of the die 30 towards the transverse element 10 is indicated by means of an arrow. Two dashed lines in FIG. 5a, illustrate an area of the first main body surface 11 over which the contact surface 32 is extending.

In FIG. 5b, it is shown how the die 30 is positioned against the first main body surface 11 of the transverse element 10. An area of the contact surface 32 of the die part 31 is put in contact with an area of the first main body surface 11 which is located between the step 24 and an area where the tilting zone 23 needs to be formed, whereas another area of the contact surface 32 of the die part 31 is projecting with respect to the step 24 and is extending at a distance with respect to the bottom part 25 of the basic portion 14.

Figure 6:
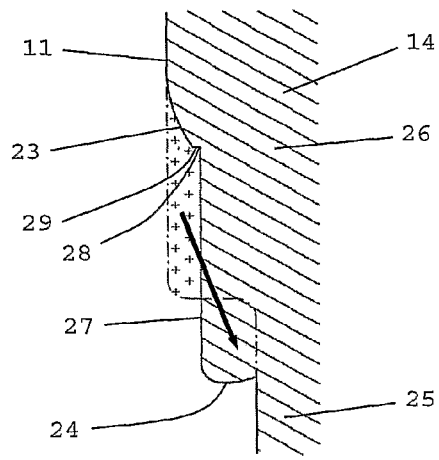
FIG. 6 illustrates a displacement of material over the main body surface of a transverse element, on the basis of which a tilting zone is formed in the main body surface.

The tilting zone 23 is actually formed in the first main body surface 11 of the transverse element 10 by exerting pressure on the die 30, in a direction substantially perpendicular to the contact surface 32 of the die part 31. Under the influence of this pressure, a displacement of material over the first main body surface 11 takes place, which is indicated by means of an arrow in FIG. 6, in which a side view of a portion of the transverse element 10 with the tilting zone 23 and the step 24 is shown. In this figure, an original contour of the first main body surface 11 is depicted by means of a dot and dash line.

Under the influence of the pressure that is exerted on the die 30, an area 27 of the top part 26 of the basic portion 14, which area 27 is in contact with the die part 31 of the die 30, is recessed, wherein the step 24 displaces downwardly as a result of the fact that material flows in a space between the contact surface 32 of the die part 31 and the bottom part 25 of the basic portion 14. For sake of completeness, it is noted that the transverse element 10 is supported in a suitable manner along the side of the second main body surface 12 during the treatment with the die 30.

Along an upper edge 28 of the recessed area 27 that is obtained, retraction of the material of the transverse element 10 takes place. As a result thereof, a round area is obtained in the first main body surface 11, which forms a transition between the recessed area 27 and the top part 26 of the basic portion 14. This round area is convexly curved, and a top part thereof, which approximately describes a segment of a circle, appears to be suitable to function as tilting zone 23. By positioning the die part 31 of the die 30 right underneath a defined area in which the tilting zone 23 needs to be located for the purpose of forming the tilting zone 23, it is achieved that the tilting zone 23 is formed at the appropriate place in the first main body surface 11 of the transverse element 10.

According to the above-described method, the tilting zone 23 is formed in an indirect manner, namely by pressing a die 30 against the main body surface 11 of the transverse element 10, wherein the tilting zone 23 is formed because retraction takes place along an upper edge 28 of the area of the first main body surface 11 at which there is contact with the die 30. As a consequence of the presence of the step 24 between the bottom part 25 and the top part 26 of the basic portion 14 of the transverse element 10, the pressure that is needed for the purpose of forming the recessed area 27 and the tilting zone 23 connected thereto may remain limited, because the material of the transverse element 10 has the possibility to flow from the area where the die 30 and the transverse element 10 are contacting each other, over the bottom part 25, which is at a lower level. Preferably, a distance between the step 24 and the area where the tilting zone 23 needs to be formed is kept as small as possible, so that, for the purpose of the formation of the recessed area 27, a displacement of material which is as small as possible is required, and the pressure with which the die 30 is pressed against the transverse element 10, may be as low as possible.

A particular aspect of the method according to the invention is that the shape of the tilting zone 23 is not dictated by a shaping die that is applied, or the like. In stead, the tilting zone 23 is formed in an area that does not touch a tool element. An important insight underlying the invention is that a retraction area that is obtained at an edge of an area of the first main body surface 11 of the transverse element 10, which area is recessed under pressure, is convexly curved, and is suitable to function as tilting zone 23.

Figure 7:
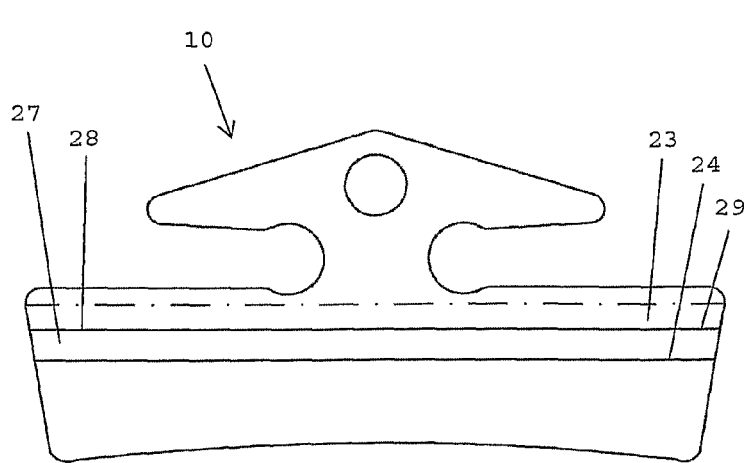
FIG. 7 shows a front view of a transverse element having a tilting zone which is obtained by application of the method as illustrated in FIGS. 5a and 5b.
Figure 8:
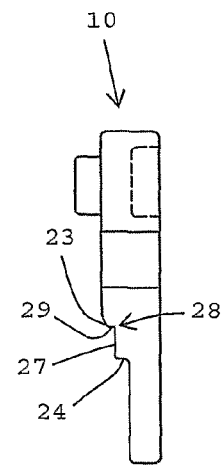
FIG. 8 shows a side view of the transverse element shown in FIG. 7.

FIGS. 7 and 8 show the appearance of a transverse element 10 having a tilting zone 23 which is formed according to the above-described method. In FIG. 7, an upper edge of the tilting zone 23 is diagrammatically indicated by means of a dot and dash line. The transverse element 10 has a substantially planar recessed area 27 that is extending from the step 24 in an upward direction, with a retraction area that constitutes the tilting zone 23 along an upper edge 28. This tilting zone 23 has a radius of curvature which decreases in a downward direction, in other words, which approximately describes a segment of an ellipse. The convexly curved tilting zone 23 is connected to the recessed area 27 through a small step 29, wherein, in the longitudinal direction of the transverse element 10, a dimension of the step 29 is substantially equal to a distance over which the die part 31 of the die 30 is pressed in the first main body surface 11 of the transverse element 10 minus a dimension in the longitudinal direction of the retraction area. Furthermore, the transverse element 10 is roughly equal to a conventional transverse element 10, for example, the transverse element 10 as shown in FIGS. 2 and 3, and the transverse element 10 may be applied and function in a same manner.

It will be clear to a person skilled in the art that the scope of the invention is not limited to the examples discussed above, but that several amendments and modifications thereof are possible without deviating from the scope of the invention as defined in the appended claims.

In the foregoing, a method has been described, which is suitable to be applied for forming a convex tilting zone 23 on a first main body surface 11 of a transverse element 10 for application in a push belt 6 for a continuously variable transmission 1, and which comprises the step of applying a die 30 that is placed against the first main body surface 11 under pressure. However, the die 30 is pressed against the first main body surface 11 just outside of an area where the tilting zone 23 needs to be formed. Under the influence of the treatment with the die 30, a recessed area 27 is arranged in the first main body surface 11, wherein retraction of the material of the transverse element 10 takes place along an upper edge 28 of this area 27. At least a part of a retraction area that is obtained in this manner is suitable to function as tilting zone 23. An important advantage of the application of the method as described is that the pressure that is exerted on the die 30 may be considerably lower than the pressure that is required for forming a tilting zone 23 during the processes known from the state of the art.

What is claimed is:

1. A method for forming a convex tilting zone in a defined area of a main body surface of a transverse element that is destined to be part of a push belt for a continuously variable transmission having two pulleys for suspending the push belt, the method comprising:
    pressing a tool element against the main body surface adjacent to the defined area of the main body surface in which the convex tilting zone needs to be formed, thereby realizing a displacement of material over the main body surface, and
    forming the convex tilting zone under the influence of retraction of material as a consequence of pressing the tool element against the main body surface.

2. The method according to claim 1
    wherein the step of pressing includes avoiding contact between the tool element and the defined area of the main body surface in which the convex tilting zone needs to be formed clear.

3. The method according to claim 1, wherein the tool element has a substantially planar portion, and wherein forming the convex tilting zone comprises pressing the substantially planar portion of the tool element against the main body surface of the transverse element.

4. The method according to claim 1, wherein the main body surface of the transverse element has a stepped shape, wherein at least two areas of the main body surface are extending at different levels, and wherein forming the convex tilting zone comprises pressing the tool element against one of these two areas.

5. The method according to claim 4, wherein forming the convex tilting zone further comprises extending the tool element at least over an area of the main body surface of the transverse element that is located between the defined area of the main body surface in which the convex tilting zone needs to be formed and an area where the two areas of the main body surface of the transverse element which are extending at different levels are connected to each other.

6. A transverse element that is destined to be part of a push belt for a continuously variable transmission having two pulleys for suspending the push belt, comprising a main body surface having a convex tilting zone formed therein, wherein a step is located in the main body surface at a position directly adjacent to a side of the tilting zone,
wherein the convex tilting zone, the step at a position directly adjacent to a side of the tilting zone, a substantially planar recessed area and a second step are successively located in the main body surface.

7. The transverse element according to claim 6, wherein a radius of curvature of the convex tilting zone decreases in a direction towards the step.

8. The transverse element according to claim 7, wherein the convex tilting zone approximately describes a segment of an ellipse.

* * * * *